US010374956B1

(12) United States Patent
Tracy et al.

(10) Patent No.: US 10,374,956 B1
(45) Date of Patent: Aug. 6, 2019

(54) MANAGING A HIERARCHICAL NETWORK

(71) Applicant: Amazon Technologies, Inc., Seattle, WA (US)

(72) Inventors: Leonard Thomas Tracy, Bothell, WA (US); Stephen Callaghan, Seattle, WA (US); Thomas Bradley Scholl, Seattle, WA (US); Edward Crabbe, Seattle, WA (US); Justin Oliver Pietsch, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 14/865,444

(22) Filed: Sep. 25, 2015

(51) Int. Cl.
*H04L 12/24* (2006.01)
*H04L 12/26* (2006.01)
*H04L 12/44* (2006.01)
*H04L 29/08* (2006.01)
*H04L 12/803* (2013.01)
*H04L 12/911* (2013.01)

(52) U.S. Cl.
CPC .......... *H04L 47/125* (2013.01); *H04L 12/44* (2013.01); *H04L 41/0816* (2013.01); *H04L 41/0896* (2013.01); *H04L 43/0876* (2013.01); *H04L 47/825* (2013.01); *H04L 67/1089* (2013.01)

(58) Field of Classification Search
CPC .... H04L 47/125; H04L 12/44; H04L 41/0896
See application file for complete search history.

(56) References Cited

U.S. PATENT DOCUMENTS

| 8,737,269 | B1* | 5/2014 | Zhou | H04L 12/28 |
| | | | | 370/255 |
| 9,559,985 | B1* | 1/2017 | Ye | H04L 49/1515 |
| 9,565,114 | B1* | 2/2017 | Kabbani | H04L 47/125 |
| 2009/0307334 | A1* | 12/2009 | Maltz | H04L 29/12028 |
| | | | | 709/219 |
| 2015/0180778 | A1* | 6/2015 | Shraer | H04L 49/356 |
| | | | | 370/238 |
| 2016/0149816 | A1* | 5/2016 | Wu | H04L 45/245 |
| | | | | 370/235 |
| 2017/0230239 | A1* | 8/2017 | Zhang | H04L 12/6418 |

OTHER PUBLICATIONS

Alizadeh, et al. On the Data Path Performance of Leaf-Spine Datacenter Fabrics Aug. 21-23, 2013 IEEE Symposium on High-Performance Interconnects.*
Jain et al., "B4: Experience with a Globally-Deployed Software Defined WAN," *ACM SIGCOMM Computer Communication Review*, vol. 43, No. 4, pp. 15-26, 2013.
Koponen et al., "Onix: A Distributed Control Platform for Large-scale Production Networks," *OSDI*, vol. 10, pp. 1-6, 2010.
McKeown et al., "OpenFlow: Enabling Innovation in Campus Networks," *ACM SIGCOMM Computer Communication Review*, vol. 38.2, pp. 69-74, 2008.

* cited by examiner

*Primary Examiner* — Jeffrey M Rutkowski
*Assistant Examiner* — Basil Ma
(74) *Attorney, Agent, or Firm* — Klarquist Sparkman, LLP

(57) ABSTRACT

The following description is directed to managing a hierarchical network including one or more network zones. In one example, a method of managing a hierarchical network includes collecting network state from respective devices of a network zone; using the collected network state to build an aggregated topology of the network zone; and transmitting the aggregated topology of the network zone to a traffic engineering service.

17 Claims, 13 Drawing Sheets

Example Topology Descriptor:
{
  "Name": <e.g., NZ-1>
  "Port Groups": {
    <Leaf Number>: {
      "Type": <e.g., a service connection or a span connection>,
      "MaxCapacity": <Total effective capacity for the leaf, e.g., accounting for internal NZ bottlenecks>,
      "Ports": {
310         <Port ID>: {
          "Client": <e.g., service name or remote NZ name>
          "Usable Capacity": <Gbps of total effective capacity, e.g., accounting for capacity to a particular client>
          "Total Capacity": <Gbps of all possible capacity>
          "Utilization": <Gbps of currently passing traffic>
          #Can include some specific information for some client types, e.g., another NZ.
          "ClientSpec": {Type: NZ, PortGroup: PortGroupID: <remote leaf>}
        }, ...<there can be one port for each client connected to this leaf, for example>...
      }
    }...<For example, there can be one port group for each leaf deployed in the NZ>....
320   }
  "Demands": {
    <Remote Name>: <Gbps used>,...< For example, there can be one entry for each tunnel that begins at the local NZ>
330   }
  "Source": {
    "Communities": ["<For example, the community or communities that identify prefixes from this NZ>"]
  }
}

In this example, there is 30 GB total capacity to the client, but congestion may start at 20 GB when packets are routed from the T1 routers to the client using ECMP.

In this example, there is 120 GB total capacity to client B, but congestion may start at 80 GB when packets are routed across the spine's columns using ECMP.

Example Tunnel Specification:

```
{
    "TunnelName": <e.g., some unique identification string, e.g. Tunnel-NZ-A-NZ-B-<DestIP> >
    "SourceNode": <Source NZ, e.g., NZ-A>
    "DestNode": <Destination, e.g., NZ-B>
    "TunnelHeader": {
      "SourceIP": <IP address>,
      "DestinationIP": <IP address>,
      "TTL": <e.g., 64>
    },
    NextHops: [
      {
        "Node": "NZ-C",
        "PortGroup": <Brick number of egress brick associated with NZ-C>,
        "LogicalPort": <Logical Port ID of egress logical port to NZ-C>,
        "Weight": <e.g., 250>
      },
      {
        "Node": "NZ-E",
        "PortGroup": <Brick number of egress brick associated with NZ-E>,
        "LogicalPort": <Logical Port ID of egress logical port to NZ-E>,
        "Weight": <e.g., 750>
      },
    ]
}
```

For example, when a partial span failure causes available capacity to be reduced from 5TB to 0.5TB, some traffic can take a longer path to the destination.

In this example, a partial span failure reduces total capacity from 5TB to 3TB. Using WCMP, the 2.5TB traffic flow can be maintained even if there is uneven capacity on the routers connecting the leaves of the network zones.

In this example, the inter-NZ capacity is unchanged, but due to a loss of internal NZ-3 links, the usable capacity on the span is reduced to 1 TB. To reduce or avoid congestion, TE can move traffic to other spans.

In this example, T2-R1 has lost 2/3 of its links to the spine. When traffic is routed to the columns using ECMP, the effective capacity between NZ-3 and NZ-4 is reduced by 2/3.

US 10,374,956 B1

MANAGING A HIERARCHICAL NETWORK

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Large computer systems, including cloud computing facilities can include many compute resources connected by a communications network. The network can include many network components or devices that can be managed so that congestion of the internal communications network may be reduced and so that network packets can be reliably communicated among the various compute resources and clients of the cloud service provider.

BRIEF DESCRIPTION OF THE DRAWINGS

FIG. 3 illustrates an example of providing an aggregated topology using a topology descriptor.

FIG. 6 illustrates an example of a tunnel specification.

DETAILED DESCRIPTION

Overview

Figure 1:
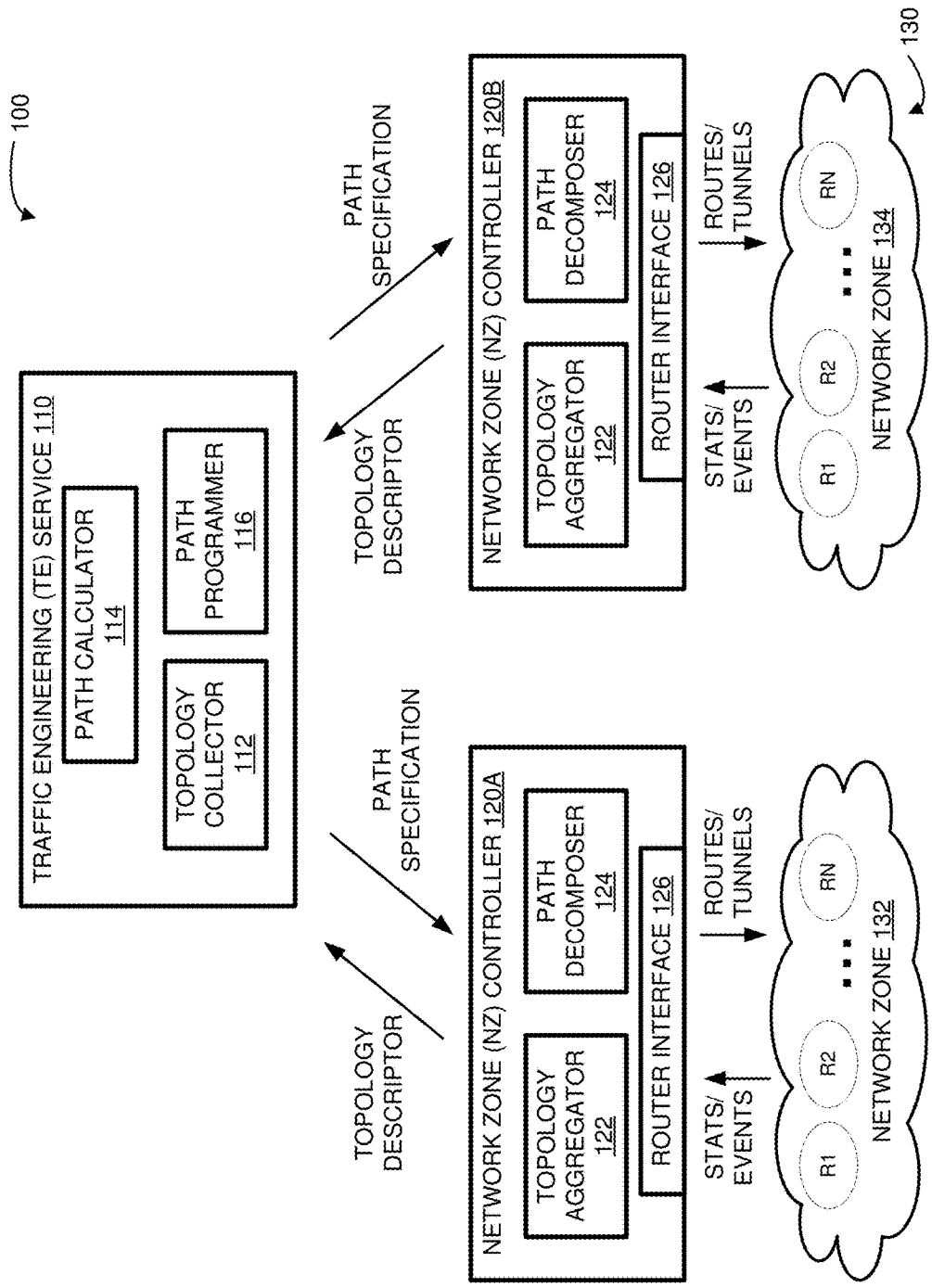
FIG. 1 is a system diagram showing an example of a traffic engineering (TE) architecture for managing a hierarchical network comprising a plurality of network zones.

A system for traffic engineering (TE) can be used to manage a hierarchical communications network and to route network traffic within the network. The different levels of the hierarchy can be used to hide lower-level details of the network from higher-level management functions. For example, a hierarchical network may be used to route network traffic between data centers of a multi-site computing facility of a cloud service provider. A TE system can include a control plane that is decoupled from a data plane. One or more controllers of the control plane can configure and monitor the network and direct traffic through the network using a network-wide view of the traffic flow. This contrasts with traditional networking paradigms where network state is distributed locally and the routing decisions are made locally.

Underlying a TE system can be a software defined networking (SDN) architecture composed of a distributed system providing core functionality including state distribution between controllers, southbound APIs/protocols allowing communication with the individual routers, and redundancy. The controller can provide a platform for network applications, such as inter-network-zone TE. A TE system can include two major control components, a TE or optimization engine that can calculate paths between regions and a network zone (NZ) controller that can de-aggregate configuration information from the TE engine and can collect statistics and push programming instructions to the individual routers of the network zone.

The TE application can operate over an abstract regional topology wherein each network zone can be represented as a single logical router. A network zone can be implemented as a leaf and spine architecture, such as a multi-tier Clos-based network comprising multiple leaves or bricks connected to a spine which interconnects the bricks. In the abstract topology, the network zone bricks can act as line cards and the inter-NZ spans are logical ports. The number and size of usable physical links between the two NZ can determine the available capacity or bandwidth of the logical port. As used herein, the terms capacity and bandwidth are interchangeable. The TE engine can calculate a single directional path between each source, destination NZ pair. For example, there can be a single tunnel from NZ-1 to NZ-2. All traffic originating in NZ-1 and destined for NZ-2 can flow through the tunnel. Weighted cost multi-path (WCMP) routing can be used to potentially make full use of the available paths through a region. Traffic can be encapsulated at the ingress of the source network zone, and the tunnel can terminate at the ingress of the destination network zone. Traffic can be encapsulated in an Internet Protocol (IP) tunnel. Tunneled traffic can be routed from NZ to NZ via controller programmed static routes that resolve to Border Gateway Protocol (BGP) learned addresses. The inputs to the TE engine, the logical link state of each NZ with available capacity of logical links and capacity for each tunnel, can be collected by the controller from the individual network zones. After the TE engine performs optimization calculations, the controllers can program the individual physical routers with the calculated paths.

As described herein, a TE system can be used to potentially increase utilization of the network resources while reducing congestion and lost packets across the network. The TE system can take into account the real-time status of the network devices, such as when links between devices fail. In a large network with thousands of links, it is likely that many links may be down at any one time, and that various links will go up and down at various different points in time. The TE system can potentially increase network availability and reduce congestion under a variety of dynamic conditions, such as during one or more of a partial span failure, a total span failure, and/or an intra-network-zone link failure.

A partial span failure can occur when only a subset of the available links between two network zones go down. Thus, the connections between the network zones may supply less bandwidth than initially advertised due to the down links. A partial span failure can produce congestion when equal cost multi-path (ECMP) routing is used to forward traffic between the two network zones. For example, traffic can continue to ECMP between the shortest paths corresponding to links that are still active between two network zones. Congestion may occur on the impacted span while leaving unused capacity on alternate routes. As disclosed herein, the available capacity on a path can be considered while forwarding traffic. When the available capacity is reduced due to link failures, traffic can be automatically re-weighted between the available paths to potentially reduce congestion. For example, routes having different lengths can be used and traffic can be routed based on the actual real-time capacity of a link.

A total span failure can occur when all of the available links between two network zones go down. A total span failure can be considered a special case of a partial span failure where the available bandwidth between two network zones becomes zero. Routing protocols may generally handle this case better than the partial failure case. For example, as long as all Border Gateway Protocol (BGP) sessions between the two network zones are dropped, traffic can be routed away from the down span. However, when multiple spans are down at the same time, it may be possible that the next shortest path does not have sufficient bandwidth to account for the failed spans. As described herein, the TE system can split traffic among paths of different lengths to avoid congestion. Thus, as long as there is a path through the network with available bandwidth, the TE system may avoid dropping frames.

An intra-network-zone link failure can occur when one or more devices or links within the network zone fail. As described herein, the TE system can account for capacity between network zones and across internal paths of the network zone. For example, the link state inside a network zone can affect the usable capacity that can be used to route packets through a network zone. The TE system can account for capacity limitations due to internal link state when allocating paths through the region.

Figure 2:
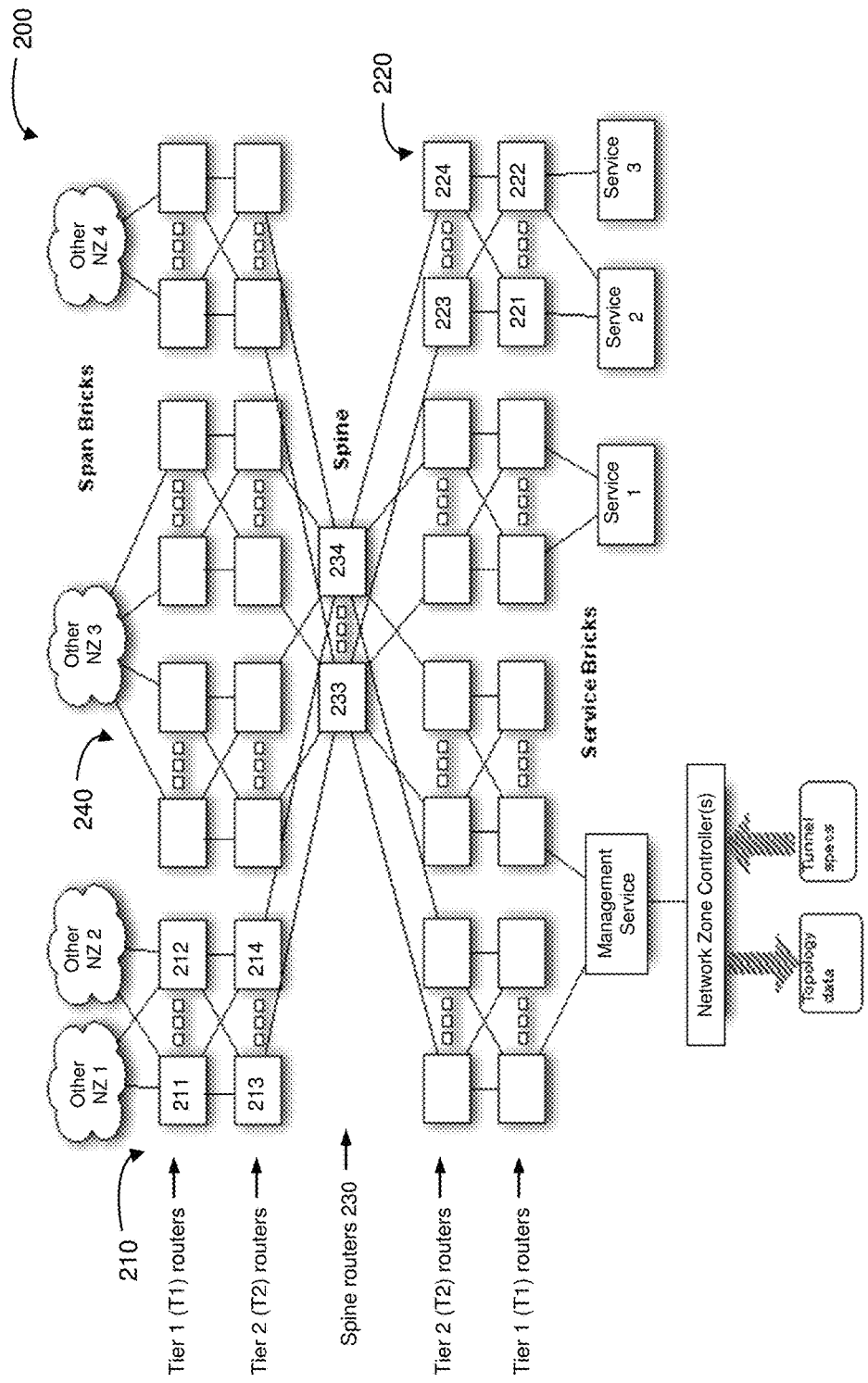
FIG. 2 is a system diagram showing an example network zone.
Figure 7:
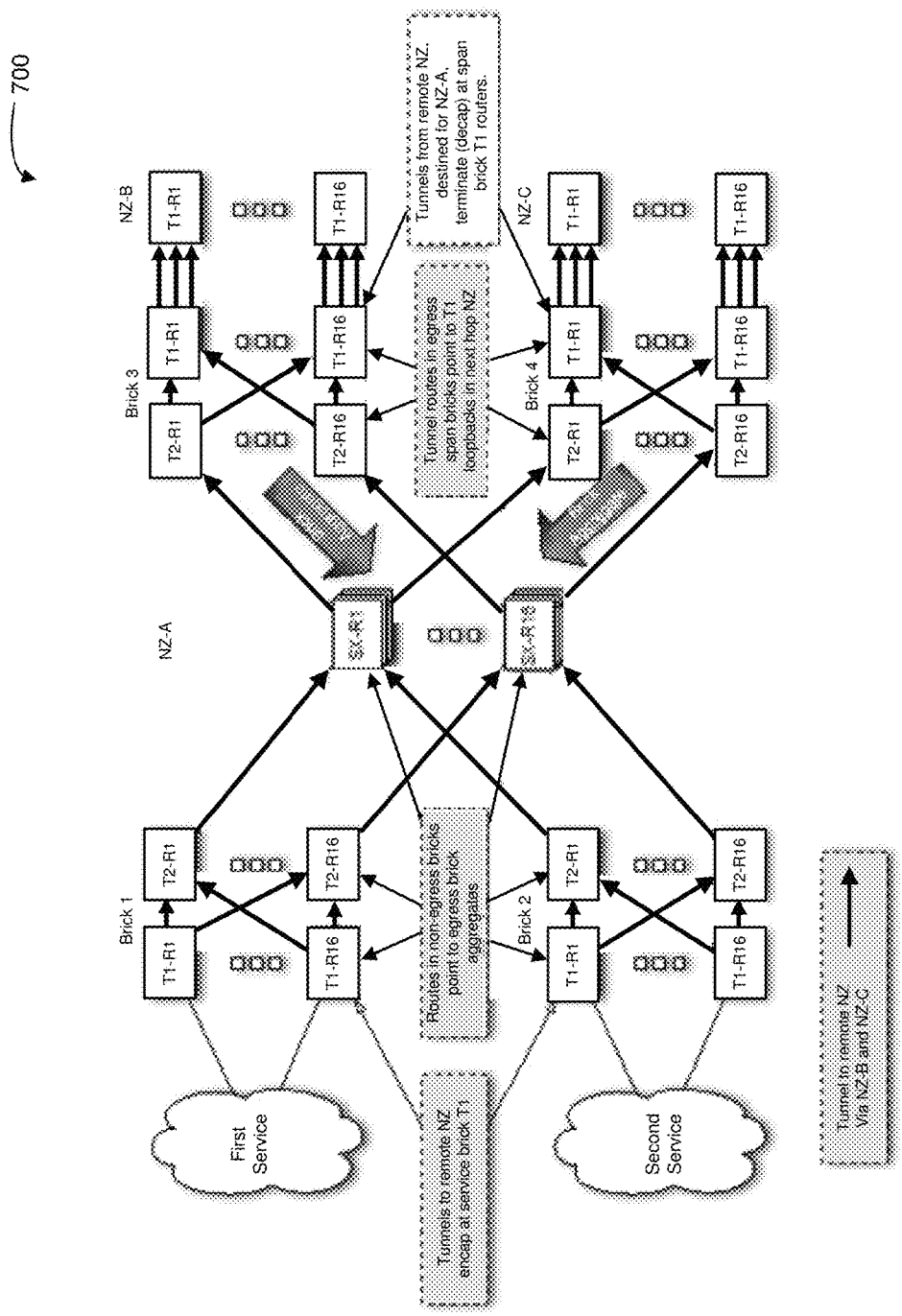
FIG. 7 shows an example of how the tunnel specification can be used to program routes through the network zone.
Figure 11:
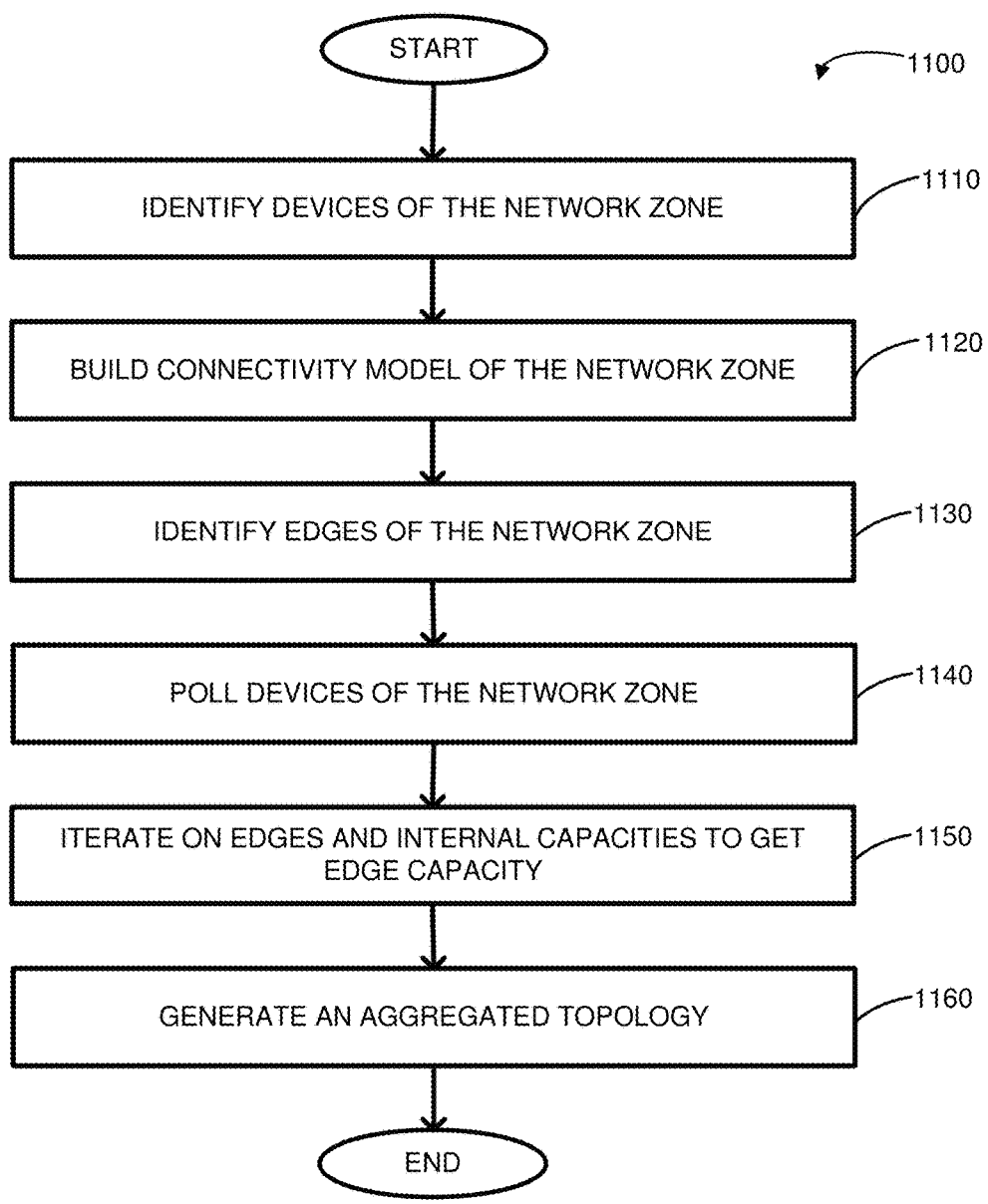
FIG. 11 illustrates an example of a method for building an aggregated topology.
Figure 12:
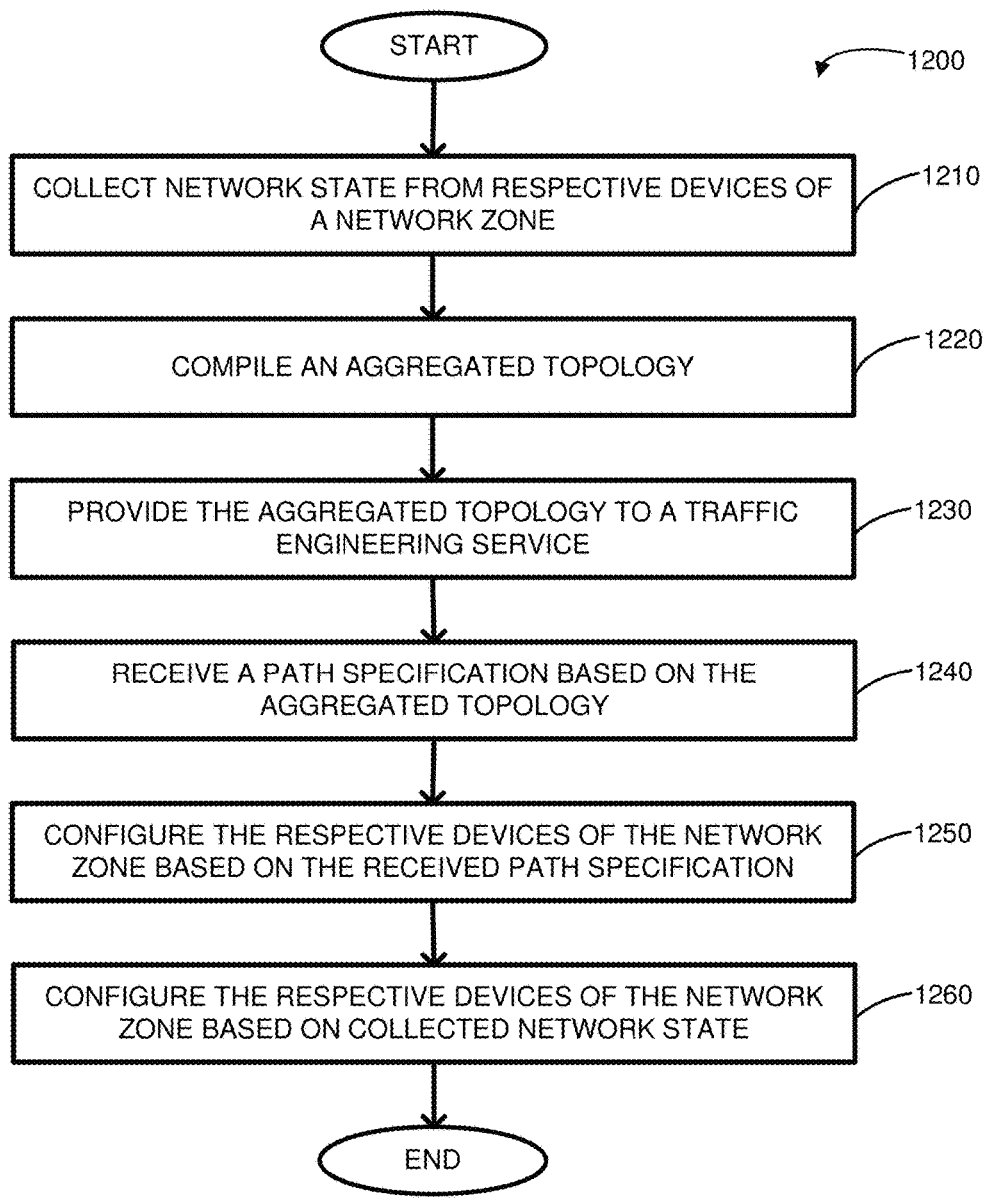
FIG. 12 illustrates an example of a method for managing a hierarchical network.
Figure 13:
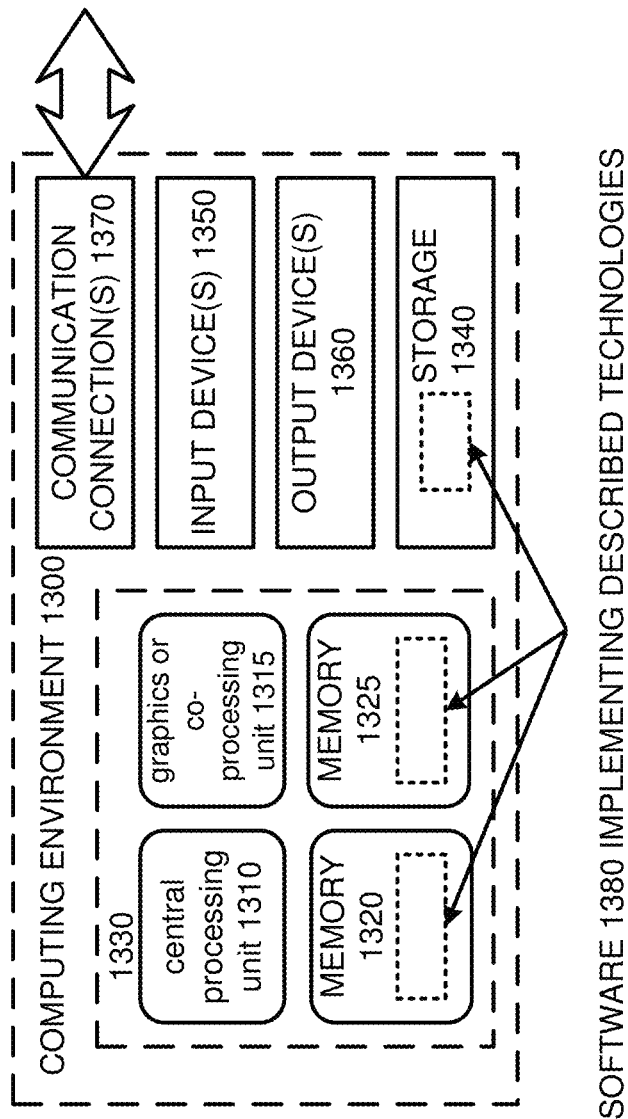
FIG. 13 depicts a generalized example of a suitable computing environment in which the described innovations may be implemented.

As described herein, systems and techniques are provided for managing a hierarchical network. Examples of a system architecture are provided in FIGS. 1 and 2. In particular, FIG. 1 shows an example of a TE architecture for managing a hierarchical network comprising a plurality of network zones. The TE architecture can include a TE service and a network zone controller associated with each network zone. FIG. 2 illustrates an example network zone. The capabilities of the network zones can be abstracted and aggregated into aggregated topologies by the respective network zone controllers and passed to the TE service. FIGS. 3-5 show examples of generating an aggregated topology, such as a topology descriptor, and additional aspects of example TE systems. The TE service can use the aggregated topologies to allocate bandwidth among the different services using the network. In particular, traffic through the network can be allocated using one or more path or tunnel specifications. FIGS. 6-10B show examples of forwarding traffic through the hierarchical network. Specifically, FIG. 6 illustrates an example of a tunnel specification that can be used to define a set of paths through the network corresponding to a source, destination pair of services. FIG. 7 shows an example of how the different devices of the network zone can be used to implement the tunnel specification. FIGS. 8A, 8B, 9A, 9B, 10A, and 10B illustrate examples of how a TE system can be used to route traffic through a network and to mitigate network events. FIGS. 11-12 illustrate examples of methods for building an aggregated topology and managing a hierarchical network. FIG. 13 depicts a generalized example of a suitable computing environment in which the described innovations may be implemented.

Examples of a Traffic Engineering Architecture

FIG. 1 is a system diagram showing an example SDN architecture 100 including a TE controller 110 and multiple network zone controllers 120A-B used to configure a hierarchical network 130 comprising a plurality of network zones 132, 134. For example, the network zones 132, 134 can be peers at the same level of hierarchy in the hierarchical network 130. The TE controller 110 can use the network zone controllers 120A-B to collect topology information and effect tunnel programming in a region or network zone. The network zones 132, 134 can be different portions of a larger communications network. For example, the network zone 132 can include interconnected network devices in a first region of the network 130 and the network zone 134 can include interconnected network devices in a second region of the network 130. Each of the individual network zones can be of the same or of a different type than the other network zones. In other words, each of the network zones 132, 134 can have the same or different types and numbers of network devices and the network devices can be interconnected the same or differently within the network zones 132, 134. The network zones 132, 134 can include a heterogeneous or homogeneous set of network devices. For example, the network devices can include switches (multi-layer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points. As a specific example, each network zone 132, 134 can include network devices arranged in a leaf and spine architecture, where each leaf includes one or more routers arranged in one or more tiers, and the leaves are interconnected via routers of the spine. As one example, a leaf can be a "brick" of routers, where a brick includes a first tier of routers (T1 routers) and a second tier of routers (T2 routers). Each of the T1 routers of the brick can be connected to each of the T2 routers of the brick. The T2 routers of the brick can be connected to the spine of the network zone. The leaves can communicate with each other across the spine using one or more "columns." Each column can provide an alternative path of communication between one leaf and another leaf. As another example, a leaf can be a single router. An example of a network zone is described in more detail below, with reference to FIG. 2.

The high-level controllers 110, 120A-B can be used to implement inter-network zone forwarding of network traffic. A respective network zone controller 120A-B can include a router interface 126 for communicating with individual routers of the network zone, a topology aggregator 122 for using information collected from the routers to create a topology descriptor, and a path decomposer 124 for breaking path programming data from the TE service 110 into per-router instructions. The TE service 110 can include a topology collector 112 for collecting and aggregating information about the network 130 from the individual network zone controllers 120A-B, a path calculator 114 for calculating inter-NZ paths through a potentially congested network 130, and a path programmer 116 for pushing programming information back to the individual network zones 132, 134.

The high-level controllers 110, 120A-B can be implemented as software executing on one or more server computers. For example, the high-level controllers 110, 120A-B can be software functions provided at a network address over an internal network of a cloud service provider. Clients, such as other services, can initiate requests to the services by sending messages to the servers executing the controller software. The controller software can process the requests and return appropriate responses by sending messages to the requesting service. Thus, the TE controller or service 110 can execute on a first server computer, the network zone controller 120A can execute on a second server computer, and the network zone controller 120B can execute on a third server computer. The TE controller 110 executing on the first server computer can be in communication with the network zone controllers 120A-B executing on the second and third server computers, respectively.

There can be a separate network zone controller 120A-B for each region or network zone 132, 134. The network zone controller(s) 120A-B can provide an abstract topology in which each network zone 132, 134 can be treated as a single node by the TE service 110. To provide this abstraction, the network zone controller(s) 120A-B can collect statistics and events, such as link utilization and link state changes, from each individual router in its network zone and publish "topology descriptors" to interested services, such as the TE service 110. The network zone controller(s) 120A-B can also make available an application programming interface (API) for network level changes, such as for programming routes and setting up tunnels in its associated network zone.

The TE service 110 can include optimization algorithms for calculating paths through the network 130 between various sources and destinations originating and terminating in the different network zones, such as network zones 132, 134. The TE service 110 can consume topology descriptors from each of the network zone controllers 120A-B, calculate paths based on the learned topology, and program IP tunnels in the network 130 via the network zone controller API. The TE service 110 can continue to monitor the topology and capacity demands by registering with each network zone controller 120A-B in the region to receive topology descriptor updates. When changes are detected, the TE service 110 can re-compute the path calculations and program a new set of tunnels to direct traffic along the updated paths. The TE service 110 can provide make-before-break functionality on path updates by programming new tunnels in the network 130.

A programming workflow can be used to implement inter-NZ-TE for a particular network zone. The workflow can be divided into three parts: data collection from the individual routers, topology abstraction, and path programming. In particular, the network zone controllers 120A-B can collect statistics and events (stats/events) from routers under their control, aggregate the information into a topology descriptor that is consumed by the TE service 110, then receive path programming data (path specification) back from the TE service 110 and decompose the paths into per router instructions (routes/tunnels).

The network zone controller 120A-B can use a reporting service (not shown) installed on the individual routers to collect data from each of the routers. The reporting service can allow interested parties (e.g., services) to register for statistics updates and event notifications. For example, the reporting service of each router in a network zone can transmit status and event messages to a router interface 126 of the network zone controller 120A-B. The network zone controller 120A-B can collect three classes of data from the reporting service, including periodic updates, event-driven updates due to a change in state, and initialization updates due to a start-up of hardware and/or software. For example, the network zone controller 120A-B can collect data from the reporting service including: (1) periodic updates of interface utilizations, including tunnel interfaces—for example, the updates can be in the form of rolling averages that occur on the order of one per minute; (2) link state events, such as routing state, Link Layer Discovery Protocol (LLDP) neighbor information, interface speed (e.g., for Link Aggregation Groups (LAG))—these messages can be sent on-demand whenever state changes are detected; and (3) configuration messages, such as configured equal-cost multi-path (ECMP) group size, which can be sent on a router or controller restart. The reporting service can be extensible, so new resources or message types can be added.

Specific examples of data that the network zone controller 120A-B can monitor are: a configured ECMP group width, which may be received once per registration; a process and/or router reboot status event, such as for detecting that the router or the reporting service is about to shutdown, or that the process or router has recently restarted; a traffic shift state event (max med, max metric) of the router, sent whenever the state changes; and a routing state message per neighbor, received whenever state changes. For example, the routing state message can signify that the adjacency is up and usable with a neighbor. It can be a combination of: routing adjacency up, link state up, active route-maps enabled (not maintenance mode), and Link Aggregation Control Protocol (LACP) up. Additional specific examples of data that the network zone controller 120A-B can monitor are: neighbor AS values, received when the value or neighbor state changes; link speed, received whenever the value changes, such as can be used for LAG; LLDP neighbor values, per interface, received whenever the value changes; a link utilization per interface—for example, average utilizations for every interface can be received at each 30 second, 1 minute, and/or 5 minute intervals; tunnel terminator utilization, such as can be used for detecting issues on a path, which can be received at each 30 second, 1 minute, and/or 5 minute intervals; and a list of routes, tunnel initiators, tunnel terminators, policy-based routes, and so forth installed by controllers for the purpose of auditing.

One potential advantage of using a controller-based architecture is to ease the scalability of upstream services by providing an abstract or aggregated topology in which each network zone appears as a single vertex or node. An analogous way of thinking about a network zone in this abstract topology is to consider it a single large chassis router. In the abstraction, the network zone controller 120A-B can serve as a supervisor module, the spine routers as a backplane, the leaves as line cards, and the collection of ports from a leaf to a client as a LAG. The network zone controller 120A-B can make the aggregated topology available to upstream services, such as the TE service 110, by aggregating the data it collects from the individual routers into a "topology descriptor." As one example, the topology descriptor can include three sections: (1) link state information, (2) capacity demands; and (3) source information. An example of a topology descriptor implemented in JavaScript Object Notation (JSON) is described below in reference to FIG. 3.

The topology aggregator 122 can use the collected network state to build an aggregated topology of the network zone 132, 134. In one example, the aggregated topology can include an inter-network-zone effective capacity for each leaf of the network zone 132, 134; an edge corresponding to each client connected to a respective leaf; and an effective capacity corresponding to each edge. Each client can be a service connected to the network zone 132, 134 or leaf of a remote network zone, for example. In another example, the aggregated topology can include a port group associated with a leaf of the network zone. The port group can have an effective capacity and one or more logical ports. Each of the respective logical ports can be associated with a client connected to the leaf of the network zone. Each logical port can have a usable outgoing capacity available for traffic of the client.

The aggregated topology of the respective network zones 132, 134 can be transmitted by the network zone controllers 120A-B to the TE service 110. The network zone controllers 120A-B can enable services, such as the TE service 110, to register to receive asynchronous topology descriptor updates. When topology or utilization changes are detected, the network zone controller 120A-B can send updated topology descriptors to all interested listeners. In addition to the asynchronous updates, the topology descriptors can be refreshed periodically to ensure continued liveliness.

The TE service 110 can receive the aggregated topologies. The aggregated topologies can be combined to create a simplified topology of the network 130, which can be used to calculate paths across the network 130. In particular, the topology collector 112 can consume the provided topology descriptors from each NZ controller 120A-B and the path calculator 114 can calculate inter-NZ traffic paths. The calculated paths can take into account real-time information about the network 130, such as capacity bottlenecks, asymmetric topologies, and grey failures. For example, the TE service 110 can account for congested paths between the network zones and can route traffic around the congestion. As another example, the TE service 110 can account for multiple paths of various capacities being available to route traffic between the network zones. As another example, the TE service 110 can account for failed or capacity-reduced links between the network zones so that traffic can be routed around grey failures. Using the global view of the network 130 from the aggregated topologies of the network zones, the TE service 110 can specify the desired set of paths for traffic to follow across the network zones in a region. In particular, the path programmer 116 can divide the paths calculated by the path calculator 114 into path or tunnel specifications corresponding to the individual network zones 132, 134.

The TE service 110 can send the path or tunnel specifications to every network zone controller 120A-B along the intended path. An example JSON representation of a tunnel specification is shown in FIG. 6. The tunnel specification can include a source and destination node (e.g., a network zone) name, tunnel header information, and a list of next hops. Information associated with each next hop can include the next hop node name, the egress logical port to reach the next hop, and a weight. The weights can be simple integer relative weights that indicate the proportion of traffic that can egress the next hop.

Each of the network zone controllers 120A-B can use the respective tunnel specifications to inject routes into the network zone that direct traffic to the next hop network zone. In particular, the path decomposer 124 can parse the tunnel specification into programming instructions for the individual routers of the network zone. For example, the programmed routes can have next hops that resolve to BGP learned routes.

In this manner, the TE controller 110 and the network zone controllers 120A-B can be used to configure the network 130 based on real-time operational status of the individual routers. For example, the system 100 can monitor traffic demands, link status, and effective capacity of inter-NZ links and install tunnels to direct traffic along less congested paths.

FIG. 2 is a system diagram showing an example network zone 200. The network zone 200 can include multiple network devices arranged in various topologies. For example, the devices of the network zone 200 can be arranged in a leaf and spine architecture. A particular leaf and spine architecture is a Clos-type architecture, such as depicted in FIG. 2. The network zone 200 can include multiple leaves or bricks, such as a brick 210 comprising routers 211-214 and a brick 220 comprising routers 221-224. The individual routers of a brick can be arranged in one or more tiers. For example, the brick 210 can include a first tier of routers (T1 routers) including routers 211 and 212, and a second tier of routers (T2 routers) including routers 213 and 214. In one embodiment, the T1 routers can be connected to clients and to T2 routers, but not to other T1 routers; the T2 routers can be connected to spine routers and to T1 routers, but not to other T2 routers. For example, a given T1 router of the brick 210 can be connected directly to all of the T2 routers of the brick 210 using different respective physical network links. A given T2 router can be connected directly to one or more of the spine routers (e.g., spine routers 233, 234) of the network zone 200 using different respective physical network links. Thus, connections between the different bricks can be indirect through the spine routers. For example, the bricks 210 and 220 can communicate through the spine routers 233 and/or 234.

The bricks can connect to the spine using various topologies. In one example, each of the T2 routers of the respective bricks can connect to a different column of the spine. A column can include one or more routers that provides an alternative path from one brick to another brick through the network zone. As illustrated in FIG. 2, the spine includes a first column including router 233 and a second column including router 234. In particular, there is a first path or column between the bricks 210 and 220 using the routers 213, 233, and 223; and there is a second path or column between the bricks 210 and 220 using the routers 214, 234, and 224. In more complicated examples, the spinal column can include multiple routers. The different columns can be used to distribute the network traffic between the different bricks to provide redundancy and increase the capacity between the bricks. For example, each column can be given an equal weight and packets can be forwarded between the bricks and across the spine using ECMP routing.

The bricks can connect to various clients. Clients can be categorized into at least two types of clients, including span clients and service clients. A span client can be another network zone and a service client can be connected to a service that is hosted by a server computer that is connected to the network zone 200. In one example, each brick connects only to one type of client. Thus, span bricks of one network zone can be connected to span bricks of another network zone. The bricks can connect to one client or to multiple clients. For example, the brick 210 is connected to both "other NZ 1" and "other NZ 2." As another example, a brick 240 is connected to only "other NZ 3."

Network packets can transit through the network zone 200 or originate from or be consumed by a service connected to the network zone 200. For example, a packet can be transmitted from one network zone and be routed through the network zone 200 and be transmitted to another network zone. As a specific example, a packet can be forwarded from "other NZ 1" to the brick 210, through the spine router 232, through the brick 240, and to the "other NZ 3." A network packet can originate from a service connected to the network zone 200. A network packet can be consumed by a service connected to the network zone 200.

Examples of Aggregating a Topology of a Network Zone

FIG. 3 illustrates an example topology descriptor 300 implemented in JSON. The topology descriptor can be used to provide an aggregated topology of the network zone to upstream services. As one example, the topology descriptor can include three sections: (1) link state information 310, (2) capacity demands 320; and (3) source information 330.

The link state section 310 of the topology descriptor 300 can be divided into "port groups." For example, each port group can represent one leaf or network zone brick. For each port group, the topology descriptor can provide a type, a total effective capacity, and a set of logical ports. The type can be either service or span, depending on the type of brick this port group represents. The total effective capacity can be a limit on the total usable capacity across all ports in the port group. The total effective capacity for a port group can be used to potentially protect against congestion of T2 devices from intra-NZ link failures. In other words, the total effective capacity of the port group can specify the amount of capacity that is usable to route packets between the leaf corresponding to the port group and the other leaves of the network zone.

A logical port can be a set of physical ports in a leaf that are attached to the same client service or to the same logical port in an adjacent NZ. Each logical port can be given an identifier and can contain remote client information, total capacity, effective capacity, and current utilization. Total capacity and utilization can be the sum of the corresponding physical port statistics across all in-service devices. Devices can be taken out of service by traffic shifting or enabling maintenance route-maps. Effective capacity can give the usable capacity that can be sent to or received from the client through the leaf, which can take into account WCMP weights that is available on the T2 routers. Determining the effective capacity is discussed further below with reference to FIGS. 4 and 5.

The capacity demands section 320 can list the amount of traffic sourced from the local NZ destined for each remote NZ. The network zone controller can determine the capacity demands for a remote NZ by monitoring the utilization of tunnel interfaces. In case there is no tunnel to the remote NZ, which may be expected during bootstrapping or while bringing a new NZ online, the remote NZ can be omitted and upstream services can consider the demand to be negligible.

The sources section 330 can describe what traffic is destined for the local NZ. For example, the traffic that is destined for a NZ can be identified using location communities on the BGP paths advertised from each community. The sources section can contain a "Communities" list that may contain one or more communities for the local NZ. The list of communities included may be known by configuration.

Figure 4A:
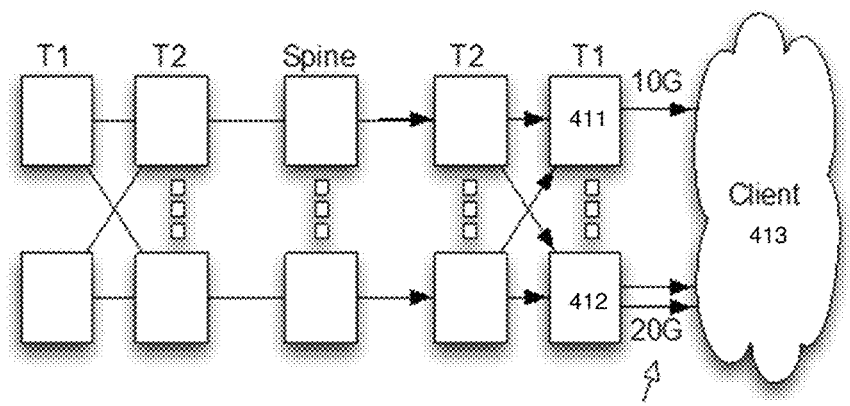
FIGS. 4A-4B show examples of bottlenecks that can occur within a network when equal cost multi-path (ECMP) routing is used.
Figure 4B:
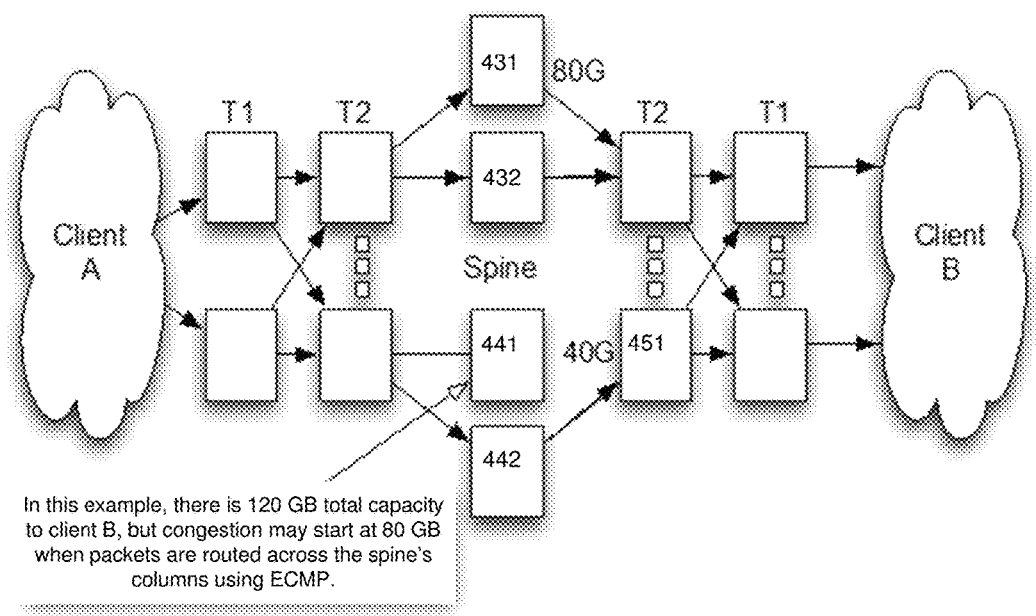
Figure 5:
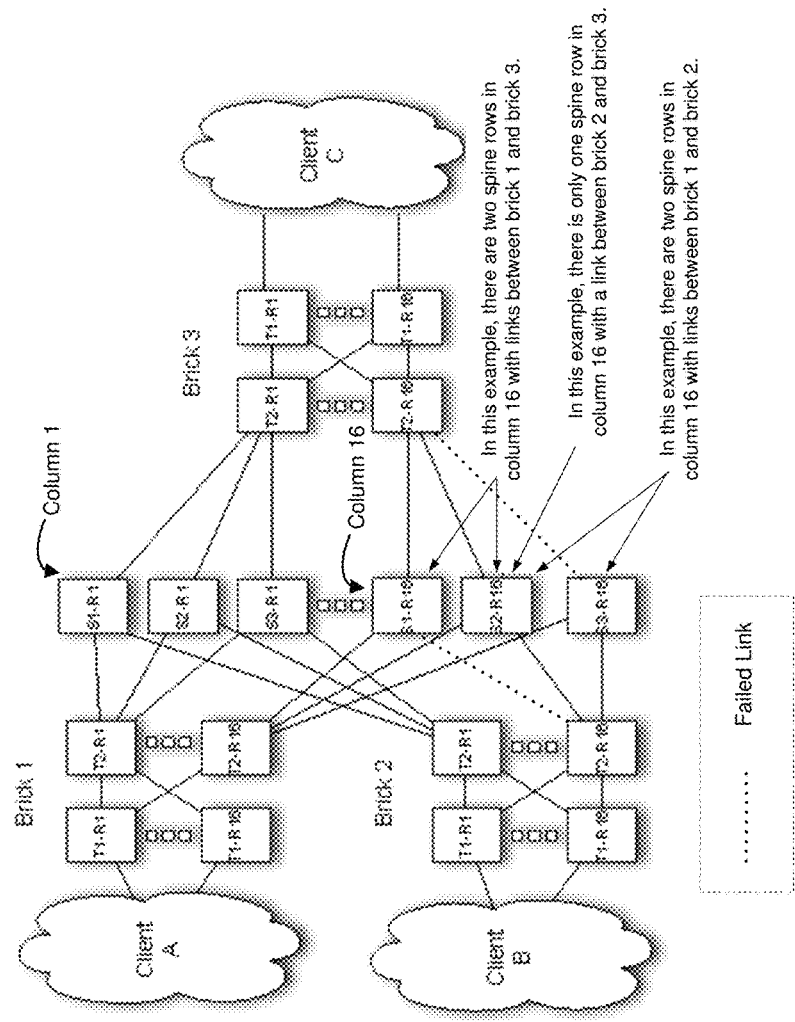
FIG. 5 illustrates an example of calculating a minimum shared column bandwidth of a network zone.

FIGS. 4A-4B show two examples where ECMP routing may render some capacity of a routing network unusable. When routers ECMP traffic across several paths, the path with the least available capacity can limit the effective capacity to the destination. Since each path receives about the same amount of traffic, the least capacity path is likely to become congested first, while the rest of the paths may have unused bandwidth. This may result in a portion of the total capacity being unusable, especially in failure scenarios.

As a specific example, FIG. 4A shows how ECMP routing between T1 routers 411, 412 and a client 413 can limit the total capacity to the client 413. In this example, the T1 router 411 can provide 10 GB of capacity to the client 413 and the T1 router 412 can provide 20 GB of capacity to the client 413. When ECMP routing is used, congestion may begin at 20 GB of bandwidth since the T1 router 411 may saturate at 10 GB, limiting the T1 router 412 to an equal share of 10 GB.

As another specific example, FIG. 4B shows how ECMP routing across the spine can limit the total capacity between client A and client B. In this example, a first column includes the spinal routers 431 and 432 and a second column includes the spinal routers 441 and 442. The routing capacity between client A and client B may be limited by the minimum shared column bandwidth through the spine. Specifically, the first column has a capacity or bandwidth of 80 GB and the second column has a capacity or bandwidth of 40 GB. For example, the second column may have less capacity than the first column due to a link failure between the routers 441 and 451. When ECMP routing is used across the columns of the spine, congestion may begin at 80 GB of bandwidth since the second column may saturate at 40 GB, limiting the first column to an equal share of 40 GB.

WCMP may increase the effective capacity issue by distributing traffic to paths based on the available downstream capacity. Even though the TE system makes use of WCMP, effective capacity can still present issues because there may be limited precision when implementing WCMP and the abstract view of a network zone may hide details of internal paths that can affect the WCMP weights.

There are two cases where effective capacity numbers can be used within the topology descriptor: the per port-group total effective capacity and the per logical port effective capacity. The per port-group effective capacity can provide a limit on traffic in a brick due to available column bandwidth, and the per logical port effective capacity can provide a limit on traffic to a client based on T1 router links.

The per port-group effective capacity can be found by assuming ECMP across the columns. ECMP is assumed in this case because upstream services may not have detailed brick to brick available capacity numbers within a network zone, and enlisting the TE controller to track the matrix of column weights between bricks may adversely impact convergence times due to the increased complexity.

The total effective capacity per port group can be a function of the minimum in-service column bandwidth and the number of in-service columns. For example, the total effective capacity per port group can be the minimum in-service column bandwidth multiplied by the number of in-service columns. As another example, the total effective capacity per port group can be less than or equal to the minimum in-service column bandwidth multiplied by the number of in-service columns. A column is "in-service" when links of the column are operational and the links can transmit network traffic. A column may be out of service when all of the links of the column fail or when a service or administrator stops traffic from flowing through the column. In one embodiment, the minimum column bandwidth can be the lesser of the "minimum shared column bandwidth" and the minimum T2-to-T1 column bandwidth. The minimum T2-to-T1 column bandwidth can be the minimum T1 facing port capacity from a T2 router in the brick. The minimum shared column bandwidth can be the minimum usable column bandwidth between two bricks, e.g., only using spine rows in the column that have a connection to both bricks. An illustrative example of minimum shared column bandwidth is shown in FIG. 5.

FIG. 5 illustrates an example of calculating minimum shared column bandwidth. In this example, both brick 2 and brick 3 have lost one link to the same column, leaving only one spine row with a link to both bricks. Specifically, the link between routers Brick2-T2-R16 and S1-R16 is down and the link between routers Brick3-T2-R16 and S3-R16 is down. Here, the columns include three spinal routers. For example, column 1 includes routers S1-R1, S2-R1, and S3-R1 and column 16 includes routers S1-R16, S2-R16, and S3-R16. Since links are down on two of the routers (S1-R16, S3-R16) between bricks 2 and 3, only one router (S2-R16) is available to route network traffic between bricks 2 and 3. Thus, the minimum shared column bandwidth for brick 3 and brick 2 is one link or 40 Gbps assuming 40 Gb links. Even though column 1 has three times the capacity, ECMP routing across the spine will be limited by column 16. However, two routers are available in column 16 to route traffic to and from brick 1. Specifically, spinal routers S1-R16 and S2-R16 can route traffic between bricks 1 and 3 and spinal routers S2-R16 and S3-R16 can route traffic between bricks 1 and 2. Thus, the minimum shared column bandwidth for brick 1 is two links or 80 Gbps assuming 40 Gb links.

A low capacity column can adversely affect the capacity across the spine when packets are routed across the columns using ECMP. Thus, the capacity across the spine may be increased by marking a column out-of-service and only using the in-service columns to route packets across the spine using ECMP. Columns can be ignored in the effective capacity calculation by marking them out-of-service. Columns can be marked out of service for a brick by traffic shifting T2 routers, or can be marked out of service for all bricks by traffic shifting the spine routers. Shifting bandwidth-constrained columns can protect against cases where multiple link failures restrict the available bandwidth to one or more bricks.

The other usable capacity number is per logical port, which can account for effective capacity across multiple T1 routers connected to the same client. The per logical port effective capacity can take WCMP routing into account in its calculation. As will be described in more detail below, WCMP can be implemented by having multiple entries per WCMP group of each T1 router. The reported effective capacity for the logical port can then be reported as:

$$EffectiveCapacity = \min_{i, E_i > 0} \frac{T_i}{E_i} \sum_j E_j.$$

where $E_i$ is the number of entries T1 router i consumes in the WCMP group and $T_i$ is the total capacity from T1 router i to the client.

Thus, the effective capacity of a logical port can take into account the amount of traffic that can be sent to or received from a client. The leaves connected to the clients can be architected so that T1 routers of the leaf have less than or equal client facing capacity as T2 facing capacity of the leaf. However, failed links between the T1 and T2 routers may create a situation where a T1 router could have more client facing capacity than T2 facing capacity. If this were to happen, a client could send more traffic to the T1 than it could send to the spine, potentially causing congestion and dropped packets. To protect against this case, the network zone controller can reduce the reported per logical port effective capacity to account for this bottleneck. Thus, the network zone controller can effectively limit that the number of active southbound links (e.g., client to T1 links) to less than or equal to the number of working northbound links (e.g., T1 to T2 links).

Examples of Forwarding Traffic Through a Network

Using the aggregated topologies provided by the network zone controllers, the TE service can calculate routes through the network zones of the network, and provide routing information, such as tunnel specifications, to the network zone controllers so that traffic can be forwarded through the network. As one example, the TE service can use a network zone controller API to program tunnels in the network according to the computed paths. For example, there can be one tunnel programmed for each source, destination NZ pair within the network. These tunnels can be point-to-point in the logical abstraction of a region, but potentially not in the physical topology. For example, traffic can be encapsulated at a given leaf router in the source NZ and get the same destination IP address regardless of which leaf router does the encapsulation. Traffic can be de-encapsulated at any of the leaf routers in the destination NZ. The traffic can follow WCMP routes through the network in order to make more effective use of the available capacity. Tunnel programming and WCMP routing are discussed in more detail below, with reference to FIGS. 7 and 9A-9B.

The tunnel programming can take place in three phases performed in series: the path programming phase, the tunnel activation phase, and the cleanup phase. In the path programming phase, routes can be added to the intermediary routers for the tunnel destination IP address, tunnel initiators can be added to the service brick T1 routers, and the tunnel decapsulation can be programmed on the appropriate span brick T1 routers of the destination network zone. In the tunnel activation phase, routes can be added or updated in the service brick T1 routers to direct traffic into the newly programmed tunnels. In the cleanup phase, unused routes, tunnel initiators, and tunnel terminators can be removed from the network zone. The TE service can program new tunnels with an unused destination IP address in the network so that currently active tunnels are unlikely to be impacted during programming.

FIG. 6 illustrates an example of a tunnel specification 600, implemented in JSON, which can be sent from the TE service to the network zone controllers of the network zones along the path. The tunnel specification 600 can prompt the network zone controller to setup tunnel initiators, terminators, and to inject routes along the tunnel paths.

The TE service can send tunnel specifications to every network zone controller in each NZ along the intended path. The tunnel specification 600 can include a source and destination node (e.g., a network zone) name, tunnel header information, and a list of next hops. Each next hop can include the next hop node name, the egress logical port to reach the next hop, and a weight. The weights can be simple integer relative weights that indicate the proportion of traffic that can egress the next hop.

The network zone controllers in each NZ can use the tunnel specification 600 to inject routes into the network zone that direct traffic to the next hop NZ. The network zone controller programmed routes can have next hops that resolve to BGP learned routes. The tunnels can be point-to-point in the regional abstract topology, but in the physical topology, traffic encapsulation can happen at any one of the service brick T1 routers in the source NZ and can decapsulate at any one of the ingress span brick T1 routers in the remote NZ. In the egress span bricks, the next hops of the static routes can be the loopbacks of the attached T1 routers in the next hop NZ. In the remaining routers, the controller can program routes that direct traffic to the egress brick aggregates.

As a specific example, FIG. 7 shows an example of how the tunnel specification can be used to program routes through the network zone. The tunnels can begin at the service brick T1 routers in the source NZ and terminate at the span brick T1 routers in the egress NZ. Routes are injected along the path to direct traffic to the next hop NZ. As a particular example, packets originating from the first service can be encapsulated at any of the T1 routers of brick 1. Packets can get the same destination IP address regardless of which individual T1 router does the encapsulation. Similarly, packets originating from the second service can be encapsulated at any of the T1 routers of brick 2. Routes in the non-egress bricks (e.g., the service bricks 1 and 2) can point to egress brick aggregates (e.g., the span bricks 3 and 4). Routes in the egress bricks can point to T1 loopbacks in the next hop network zone. Tunnels from remote-NZ destined for the local-NZ can terminate at any of the span brick T1 routers. In other words, tunnel decapsulation can occur on any span brick T1 routers at the ingress of the destination NZ.

In one embodiment, intra-NZ routes between the leaves and the spine can be routed using ECMP. For example, routes between the T2 and spine routers can be routed with ECMP, while WCMP routes can be used for intra-NZ routes between the T1 routers and the T2 routers of a brick, and for inter-NZ routes between different network zones. In an alternative embodiment, WCMP can be used for routing between any of the tiers of routers.

The tunnel specification can support WCMP routing by providing a weight associated with each next hop. Each next hop in the routes installed on the routers by the network zone controller can include a weight. The routers can use the weights to program the hardware to do WCMP as described in more detail below. The weights of the next hops that point to the egress span brick aggregates (e.g., brick 3 and brick 4) can be the weight specified in the path specification. The weights on the next hops in the egress span bricks that point to T1 loopbacks in the next hop network zone can correspond to the total capacity of each connected T1.

The network zone controllers can directly manage the WCMP weights on tunnel routes in egress span bricks. In other words, the network zone controllers can directly manage the WCMP weights associated with the out-going inter-NZ links. The network zone controller can be notified of capacity changes by event messages from the routers, and the network zone controller can directly send route update messages with updated weights to the individual routers. This can potentially reduce the effect of congestion events from grey failures that leave T1 routers with unbalanced capacity. The WCMP weights on routes outside of the egress span brick can be set by the TE service, so they can be updated with new path specifications from the TE service.

The network zone controllers can also program tunnel initiators and tunnel terminators based on the tunnel specification messages. The tunnel initiators can be programmed on the service brick T1 routers in the source network zone, and tunnel terminators can be programmed on the T1 routers of the span bricks in the destination network zone.

The network zone controllers can specify WCMP for configured routes. The weights can be specified as an integer weight for each next hop. The weights can be interpreted as relative portions of traffic to be sent to a particular next hop, e.g., the fraction of traffic sent to a hop can be its weight divided by the sum of all next hop weights on the route. There is support for specifying WCMP via relative integer weights on next hops in the Linux kernel.

As a specific example, the network zone controllers can execute a routing software suite, such as a Quagga. The routing software suite can include options in the configuration for specifying weight, and then appropriately transferring the weight to recursive next hops. The latter part can be used, for example, if a static route has two next hops with unequal weights, and then each next hop resolves to routes with multiple equal paths (resolving to a WCMP route can be accomplished in a similar manner). The process for calculating the final weights installed in the kernel can be a three-step process. First, determine the (least common multiple) LCM of the recursive next hop counts, e.g., if there were three original next hops, a, b, c that were recursed to 2, 3, 5 next hops respectively, the LCM of the set is 30. Second, determine the new weight of each recursive next hop. For example, consider a next hop A that was recursed into a new set of next hops A'. The new weight for each next hop can be found by multiplying the sum of all original weights by the LCM found in step 1, and then dividing by the number of next hops in the new set A'. As a specific example, consider three next hops, a, b, c with weights 10, 20, 10. The three routes recurse, respectively, to a' with 2 next hops, b' with 3 next hops, and c' with 5 next hops. The LCM of the recursive next hop count set is 30. In this example, the weights for a' next hops are 10*30/2=150; the weights for the b' next hops are 20*30/3=200; and the weights for the c' next hops are 10*30/5=60. Finally, combine any duplicate next hops together by adding their weights, so that each next hop appears only once in the set installed in the kernel.

When the next hops are installed in the Linux kernel with weights, the kernel can initiate an update of the router configuration by sending messages with the new weights to the router configuration software. For example, the router configuration software can be a daemon executing on a processor of the router. The router configuration software can update the router programming with the new next hops. Some routers can include direct support for WCMP, providing a WCMP group table with weights for each next hop for a destination route. Other routers can include support for WCMP through an ECMP feature. To provide ECMP, a router can include a layer-3 (L3) ECMP group table where applications can provide a list of next hop buckets or entries for a destination route. The router can generate a flow hash on received packets and mod the calculated hash value by the number of next hops in the specified ECMP group to select a specific next hop for the packet. The traffic can be "equally" distributed to all the next hops in the list if each next hop appears in the group an equal number of times (usually once). WCMP can be accomplished by listing next hops an uneven number of times. For example, a route can get two-thirds of the traffic if it is listed twice and the alternative route is listed only once.

The ECMP GROUPs can be stored in Ternary Content Addressable Memory (TCAM) for quick retrieval when making routing decisions. The number of available entries per ECMP GROUP in the router can reduce the granularity with which traffic can be divided across a set of next hops. The number of entries per group can be a boot time configuration. There are a specific number of ECMP next hop entries available in the router and the number of next hop entries used per group can be uniform, so there can be a tradeoff between the configured number of entries per group and the total number of groups that can be defined. As a specific example, a router can include 16,384 entries which can be configured to have 256 distinct groups with 64 entries per group. Thus, each time a next hop appears in a group, it can get at least ¹/₆₄th of the total traffic flows (assuming perfect hashing).

The router configuration software can convert the kernel route with integer weights on the next hops into a WCMP group. The router configuration software can determine the number of buckets to use in the WCMP group as the minimum of the least common multiple (LCM) of the fractions of traffic destined for each next hop and the configured maximum number of buckets, or:

NumBuckets=min(LCM(W),MaxBuckets), where W is a vector of the weights on the route's next hops, and MaxBuckets is the configured maximum number of buckets. In an alternative embodiment, the number of buckets can be:

$$NumBuckets = \min\left(ECMPGroupWidth, LCM\left(\frac{W}{GCD(W)}\right)\right).$$

The number of times a particular next hop, i, should be repeated in the group is:

$$EntriesPerGroup_i = \left\lfloor NumBuckets \frac{W_i}{\sum_j W_j} \right\rfloor$$

where the brackets indicate the floor function.

Once the path programming phase is complete, the TE service can send "Tunnel Activation" messages to the network zone controllers in the source NZ. A tunnel activation message can give the tunnel name and a list of communities that can be directed to the tunnel. When a network zone controller receives a tunnel activation message, it can use a policy-based routing service to direct traffic into the tunnel at the head-end routers. An API of the policy-based routing service can provide some policy based routing functionality, such as by injecting forwarding information base (FIB) static routes based on the presence of communities on BGP paths. The network zone controller can send a message to the router listing the communities provided by the TE service and a next hop of the tunnel interface.

Once the tunnels are programmed and activated, the TE service can signal the network zone controllers to cleanup unused tunnels. The network zone controller can then generate API requests to remove all programmed routes, initiators, and terminators on all routers.

FIGS. 8A, 8B, 9A, 9B, 10A, and 10B illustrate examples of how a TE system can be used to route traffic through a network 810 and to mitigate network events. The examples will be described using the same network 810 as in FIG. 8A. For the sake of simplicity, only the tunnel from NZ-A to NZ-B is described. However, a TE system can maintain tunnels between all NZ of a network. For each scenario in FIGS. 8B, 9B, and 10A, an alternate tunnel programming is shown that can reduce or avoid congestion compared to the programming in FIG. 8A.

Figure 8A:
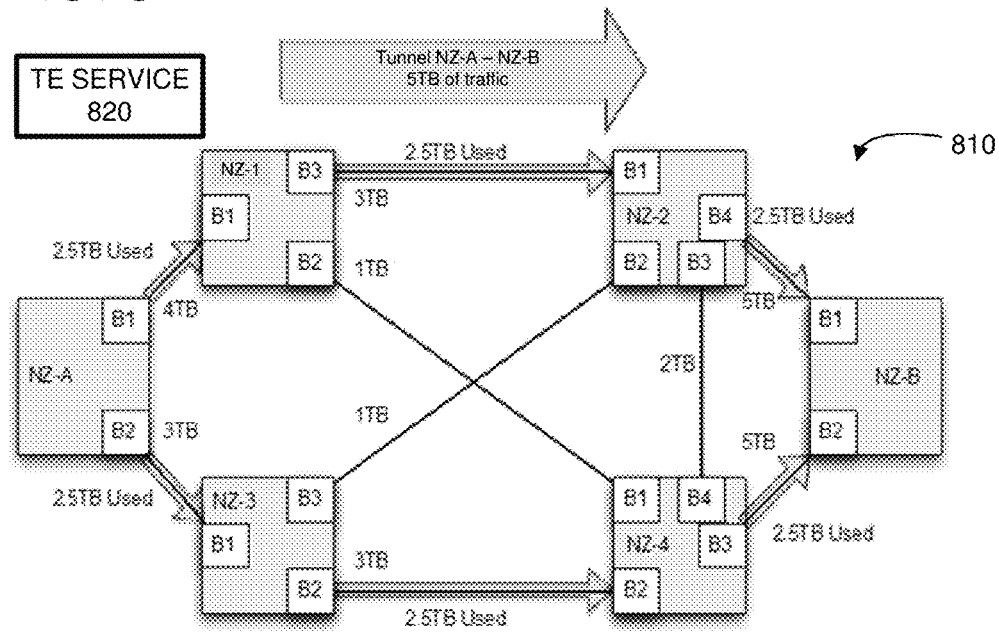
FIGS. 8A, 8B, 9A, 9B, 10A, and 10B illustrate examples of how a TE system can be used to route traffic through a network and to mitigate network events.

FIG. 8A illustrates an example of routing through a network 810 comprising multiple network zones. The network zones can be connected through various inter-NZ connections comprising multiple network links. The inter-NZ connections can provide different bandwidth capabilities between the various network zones. For example, the connection between NZ-A, brick B1 and NZ-1, brick B1 can be 4 TB while the connection between NZ-A, brick B2 and NZ-2, brick B1 can be 3 TB. Each network zone can include leaves or bricks that are connected to various respective clients, where each client can be a service or a remote network zone. Each network zone can include a network zone controller (not shown) that can provide an aggregated topology and capacity demands to the TE service 820, such as by communicating a topology descriptor to the TE service 820. The TE service 820 can generate a tunnel or path specification for each service of the network zone so that congestion through the network 810 is potentially reduced. The tunnel specification can be communicated to each of the network zone controllers so that routes can be programmed at the individual routers of the respective network zones. The topology descriptors and tunnel specifications can be adapted in real-time to account for changes in traffic demands and/or network events, such as failed links between the network zones.

As a specific example, a tunnel can be configured to route traffic between NZ-A and NZ-B. In particular, a service (not shown) connected to a service brick of NZ-A can generate 5 TB of traffic to be transmitted to a service (not shown) connected to a service brick of NZ-B. The capacity demand can be transmitted from the network zone controller of NZ-A to the TE service 820, and the TE service 820 can calculate routes and transmit tunnel specifications to the different network zones of the network 810 so that the individual routers of the network zones can be programmed. Since none of the inter-NZ links connecting the NZ-A to other network zones can carry 5 TB of traffic, the TE service 820 can specify that the outgoing traffic of the tunnel will be split between the bricks B1 and B2, such as by giving equal weights to the egress paths from the bricks B1 and B2. Thus, the full 5 TB of traffic can be transmitted from NZ-A to NZ-B.

Figure 8B:
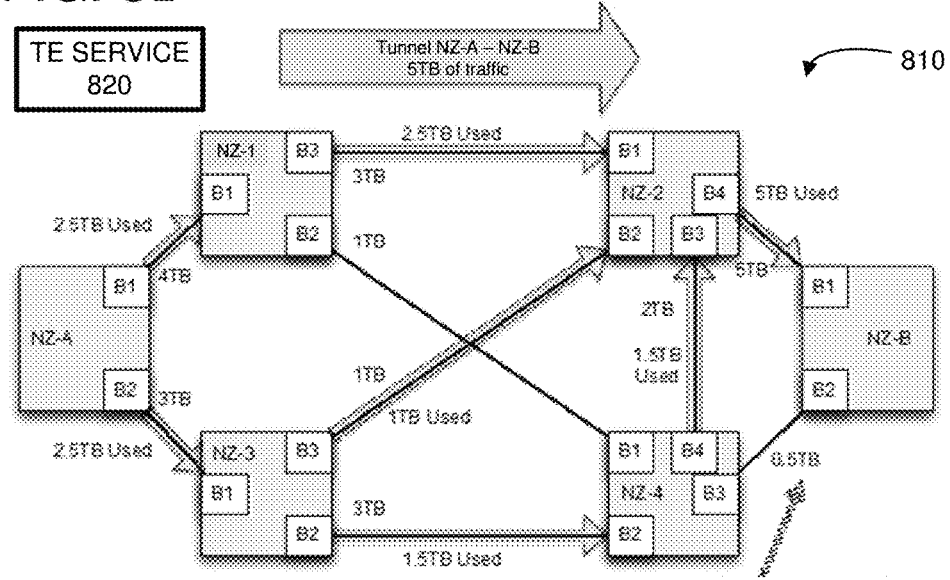

In FIG. 8B, a majority span grey failure has occurred between NZ-4 and NZ-B, reducing the capacity of the span from 5 TB to only 0.5 TB. Without TE, this type of grey failure may require human intervention to manually shift traffic off the span, because some links on the span remain active. However, with TE, the network zone controllers can monitor the available links between the two NZ and report the reduction of capacity to the TE service 820. The TE service 820 can calculate new tunnel paths, and the network zone controllers can be instructed to program a new path across the region. One possible outcome is shown in FIG. 8B, but other alternatives are also possible. As illustrated, the traffic passing through network zones 3-4-2 takes an extra hop compared to the traffic passing through network zones 3-2. The TE service 820 can split the traffic through NZ-3 by specifying a weight of 3 for the path from brick B1 to B2 and a weight of 2 for the path from brick B1 to B3, so that the traffic is split in a ratio of 1.5 TB/1.0 TB.

Figure 9A:
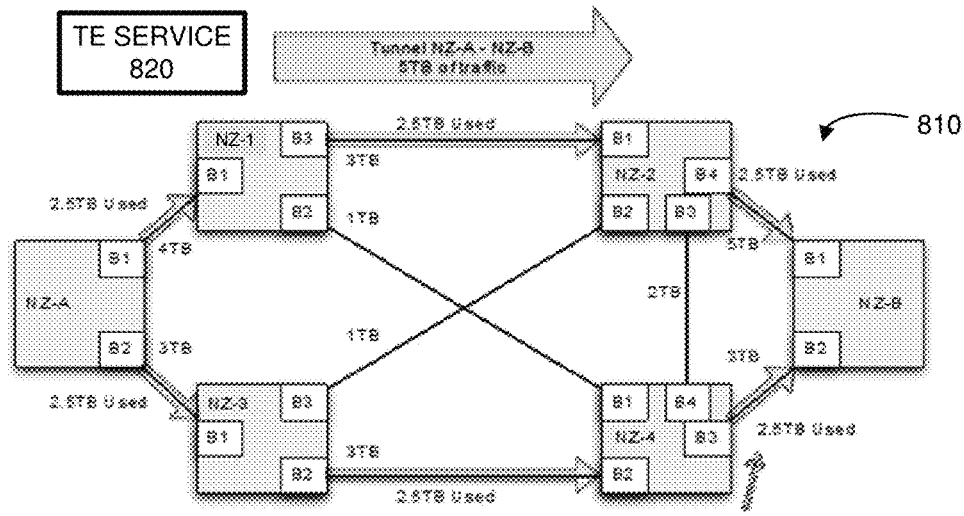
Figure 9B:
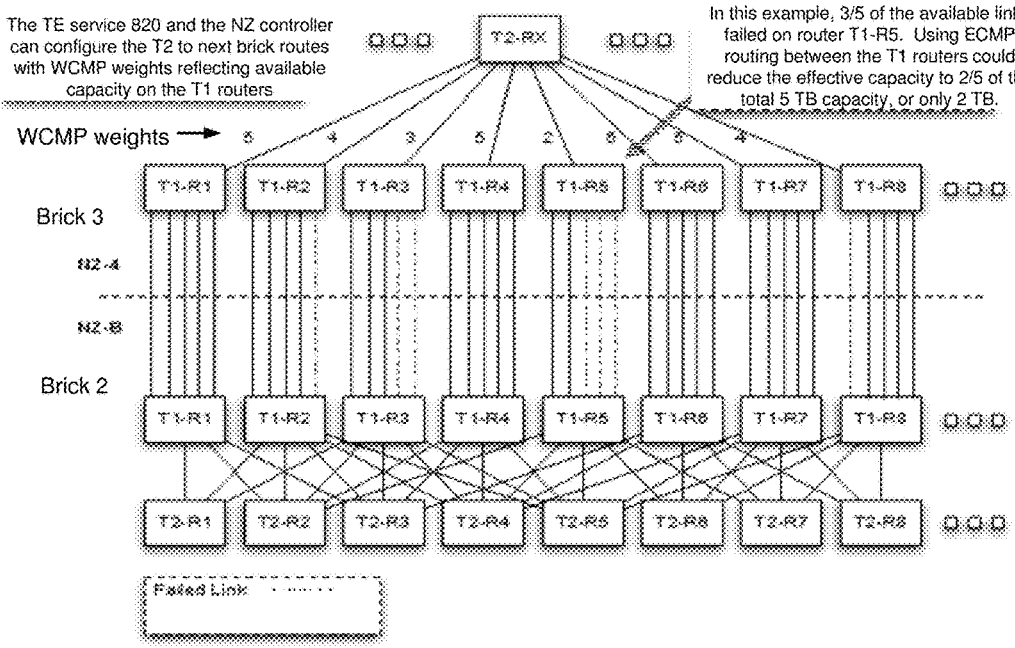

In FIG. 9A, a minority span grey failure has occurred between NZ-4 and NZ-B, reducing the capacity of the span from 5 TB to 3 TB. The 3 TB total capacity of the span is still large enough to handle the 2.5 TB of assigned bandwidth if the individual links of the span can be utilized. As an example, in FIG. 9B, details of Brick 3 of NZ-4 and Brick 2 of NZ-B are shown, including the individual links connecting the T1 routers of each network zone. In this example, each T1 router of one network zone is connected to a corresponding T1 router of the other network zone using five network links. However, the links connecting the T1 routers have failed unevenly across the connection. In particular, three network links are down for T1-R5, two network links are down for T1-R3, and one network link is down for each of T1-R2 and T1-R8. If the packets are routed from the T2 routers to the T1 routers using ECMP, then congestion can begin when the lowest capacity T1 connection begins to saturate. Since the T1-R5 router has the lowest capacity (assuming all links carry the same capacity) at $2/5$ of the full capacity link, congestion may begin at 2 TB. In contrast, WCMP routing can weight each of the T1 connections based on the actual capacity through the link so that the full capacity of the link can be utilized.

For example, a TE system can use WCMP to distribute the traffic according to the available client capacity on each T1 router, thereby more efficiently using the available links and avoiding the congestion. When the network zone controller detects a change in available capacity from the T1 routers, such as when a link fails, the network zone controller can both automatically update the WCMP distribution of the tunnels without direction from any upstream services and generate an updated topology descriptor. The network zone controller can update the regional state after the failure and the weights assigned to each T1 router in the NZ-4 egress brick. As a specific example, the WCMP weights can be adjusted so that a weight of 1 is given for each link that is operational. Thus, a T1 router with 5 operational links can have a weight of 5 and a T1 router with 2 operational links can have a weight of 2. The network zone controller can provide the topology descriptor to the TE service 820 which can update the tunnel specifications for each of the network zones. The network zone controllers can further adjust the WCMP weights programmed at each individual router in order to reduce congestion throughout the network 810.

Figure 10A:
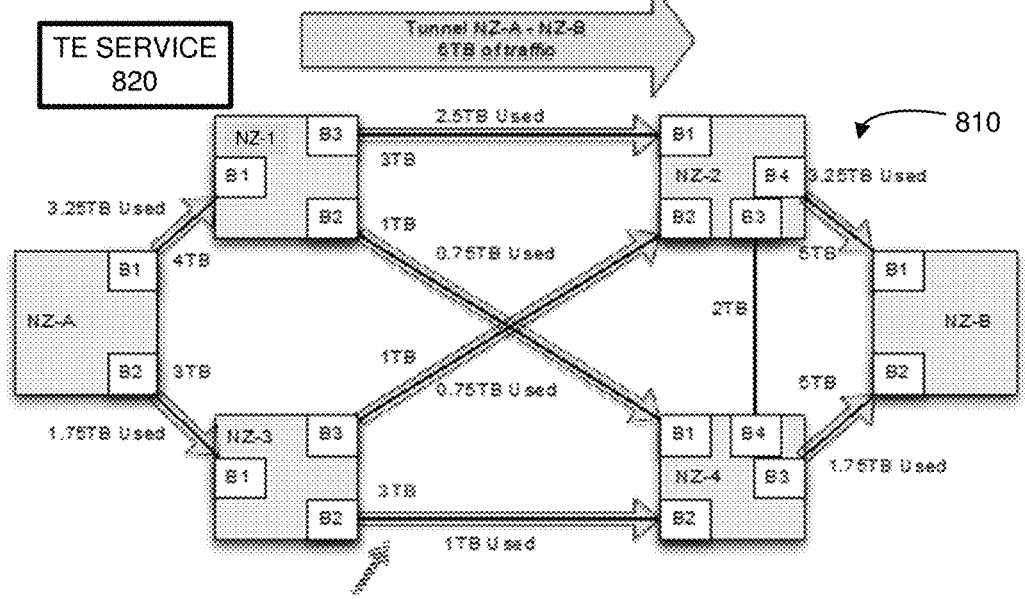

In the example of FIG. 10A, the total inter-NZ capacity is maintained, but intra-NZ link failures can reduce the total effective capacity through the network zones. In particular, link failures within the NZ-3 network zone can reduce the effective capacity between NZ-3 and NZ-4 to 1 TB despite there being 3 TB of inter-NZ total capacity. The reduced internal capacity of the network zone can be specified in the topology descriptor provided to the TE service 820 so that the TE service 820 can re-route traffic to reduce or eliminate congestion in the network 810. As one example, the TE service 820 can re-route the traffic as illustrated in FIG. 10A.

Figure 10B:
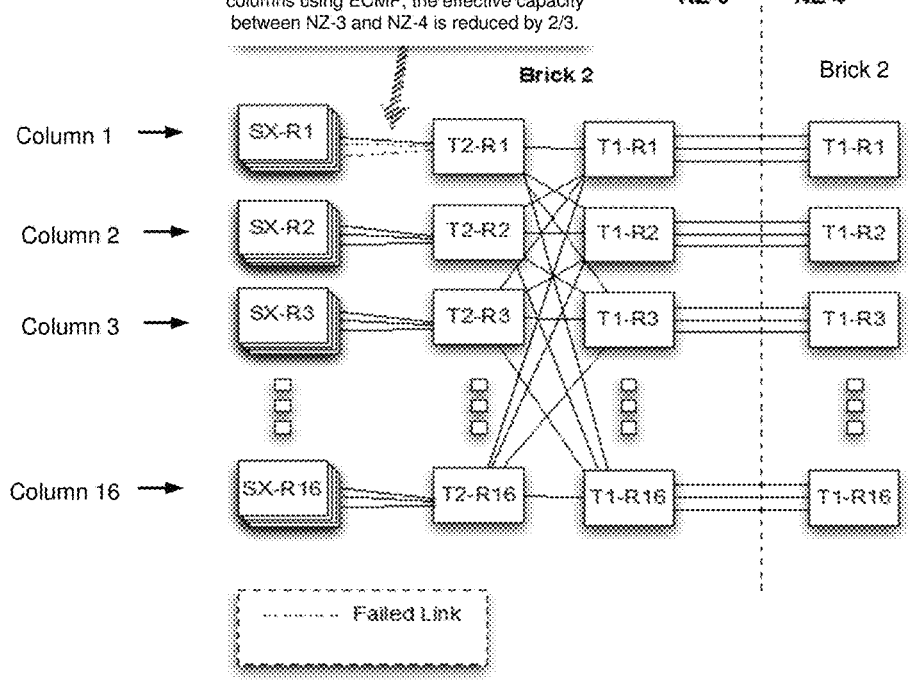

As a specific example of how the inter-NZ failures can limit the capacity through a network zone, FIG. 10B illustrates details of Brick B2 of NZ-3, including the individual links connecting the T2 routers to the spine routers. In particular, two-thirds of the links of the column including spine routers SX-R1 and T2-R1 are non-operational. Thus, the minimum shared column bandwidth between the bricks B1 and B2 of NZ-3 is one-third the maximum usable column bandwidth. When traffic is routed across the columns using ECMP, congestion can occur when the volume of traffic is equal to the minimum shared column bandwidth multiplied by the number of columns, which in this example is 1 TB. Thus, the link failures in column 1 can reduce the inter-NZ capacity between bricks B1 and B2 to one-third the maximum capacity. The network zone controller can monitor the intra-NZ links and also adjust traffic to reduce congestion in the network 810. For example, the network zone controller can take column 1 out-of-service so that the intra-NZ capacity between bricks B1 and B2 can be $15/16$ of the maximum capacity (assuming that the only down links are in column 1).

Additional Examples

FIG. 11 illustrates an example of a method 1100 for building an aggregated topology, such as the topology descriptor 300 of FIG. 3. At 1110, devices of a network zone can be identified. For example, the network zone controller can have a direct connection, such as via a management interface, to all the devices of the network zone. The network zone controller can identify the devices by a media access control (MAC) address, an IP address, or other identifying information. For example, the network zone controller can read registers or memory of the network devices of the network zone. Additionally or alternatively, the network devices can send messages to the network zone controller at power-up or during other configuration events. The messages can include information which identifies each of the network devices. As another example, the information about the individual network devices can be stored in a database accessible by the network zone controller.

At 1120, a connectivity model of the network zone can be built. The connectivity model can include all of the nodes or vertices of the network (e.g., the network devices) and all of the individual links that connect the individual network devices.

At 1130, edges of the network zone or identified. Each of the edges can include one or more individual network links. For example, multiple links can be bundled or aggregated into a single edge. The edges may include one or more inter-NZ edges and/or one or more intra-NZ edges. As one example of an inter-NZ edge, an edge can be a connection from a leaf of the network zone to a client of the network zone, where the client can be a leaf of a different network zone or a service associated with the network zone. Thus, one or more edges can be associated with a leaf of the network zone. Intra-NZ edges can correspond to internal paths from the leaf to a service associated with the network zone. Intra-NZ edges can correspond to internal paths from the leaf to a span leaf that is connected to one or more other network zones. For example, an edge can correspond to a column between one leaf and another leaf. An effective capacity can be determined for the intra-NZ edge, representing the amount of traffic that can be routed between the leaf and the span leaf or the service. As a specific example, the intra-NZ edges can be defined using a port group, as described with reference to FIG. 3.

The edge will be an inter-NZ edge when the leaf is attached to a different network zone. There can be multiple discrete edges between two network zones when there are multiple leaves used to connect the network zones. The different edges can have different effective capacities carrying different amounts of network traffic using WCMP routing. As a specific example, the inter-NZ edges can be defined using a logical port of the port group, as described with reference to FIG. 3.

At 1140, devices of the network zone can be polled. For example, the network state associated with each of the network devices and its respective ports can be gathered. Changes in state can be captured, such as a link going up or down. Statistics such as memory or link utilization, dropped packets, and so forth can be gathered. Thus, by polling the devices of the network zone, the real-time status of the network devices can be gathered.

At 1150, the edges and internal capacities of the network devices can be iterated on to get the edge capacity. For example, the internal capacities of the network devices or across columns of the network zone may limit the amount of traffic that can be transported across an edge. Thus, the edge capacity may be reduced to account for any internal bottlenecks. For example, the bottlenecks can be due to failed links, limited memory, or other resource limitations.

At 1160, an aggregated topology can be generated. For example, the aggregated topology can be a topology descriptor of the network zone. The aggregated topology can include an inter-network-zone effective capacity and an intra-network-zone capacity for each leaf of the plurality of leaves. For example, a topology descriptor can include a port group associated with each leaf of the network zone. The effective capacity of the port group can be representative of the capacity between the leaf associated with the port group and any other leaf of the network zone. Thus, the effective capacity of the port group can be representative of the intra-network-zone capacity of its associated leaf. For example, the effective capacity of a given port group can be a function of the minimum column bandwidth and the number of in-service columns associated with the leaf. More specifically, the effective capacity of a given port group can be proportional to the minimum column bandwidth and the number of in-service columns associated with the leaf. The aggregated topology can include an edge corresponding to each client connected to a respective leaf, and an effective capacity corresponding to each edge. For example, the topology descriptor can include a logical port associated with each client connected to a respective to a respective leaf. The effective capacity of the logical port can be representative of the capacity of the individual network links between the leaf and the client. Thus, the effective capacity of the logical port can be representative of the inter-network-zone capacity of its associated leaf and client.

FIG. 12 illustrates an example of a method 1200 for managing a hierarchical network. For example, the hierarchical network can include multiple interconnected network zones, and each network zone can include multiple leaves. At 1210, network state can be collected from the individual network devices of a network zone. For example, the network state can be collected at a network zone controller for the network zone. The network state can be collected based on an event occurring, such as when the individual network devices are powered on, configured, and/or when one or more network states change at the network device. For example, the network state can be collected when a link connected to the network device fails or is brought on-line. The network state can be collected before traffic is forwarded across the network zone and while traffic is forwarded across the network zone. The network state can be collected periodically. For example, the network devices can send regular updates of various statistics, such as link errors, link utilization, and so forth. Thus, the collected network state can be indicative of real-time network conditions.

At 1220, an aggregated topology can be compiled or generated, such as by the network zone controller. As described above, the aggregated topology can include an inter-network-zone effective capacity and an intra-network-zone capacity for each leaf of the plurality of leaves. Thus, the aggregated topology generated by a first service or controller can be used by another service, such as the traffic engineering service, to determine the real-time capacity of network paths through and between the different network zones of the hierarchical network. The granularity of the paths in the aggregated topology can be at the leaf level. Thus, the state of the individual devices within a leaf can be aggregated and abstracted into the properties of the leaf. The aggregated topology can be generated and updated as conditions of the network change, based on the collected network state from the individual network devices. For example, the aggregated topology can be updated when a minority or majority span grey failure is detected and/or when a reduction in column capacity is detected.

At 1230, the aggregated topology can be provided to a traffic engineering service. For example, the network zone controller can send a message to the traffic engineering service indicating that the aggregated topology is ready to be uploaded to the traffic engineering service. As another example, the network zone controller can transmit the aggregated topology to the traffic engineering service. The traffic engineering service can use the aggregated topologies from each of the network zones to build a topology of the hierarchical network. The traffic engineering service can be used to allocate or reserve bandwidth in a manner that may reduce congestion through the hierarchical network. For example, a service connected to a first network zone (a source service) may request capacity to an endpoint or service connected to a second network zone (a destination service). The traffic engineering service can calculate one or more paths through the network zones for forwarding the traffic between the source service and the destination service. Multiple paths may be used to provide redundant paths and/or to route around congestion. The paths and their relative weights can be specified in a path or tunnel specification. For example, a path that is desired to take more traffic can be given a higher weight than a path that is desired to take less traffic. The granularity of the path specification can be at the leaf of the network zone level, for example. Thus, the traffic engineering service can be used to make high-level routing decisions (such as based on choke points or congestion between the network zones) and to provide the results of the high-level routing decisions via the path specifications.

At 1240, a path specification based on the aggregated topology can be received. For example, the path specification can be received at the network zone controller. The paths in the path specification can be decomposed so that individual network devices of the network zone can be configured.

At 1250, the respective devices of the network zone can be configured based on the received path specification. As an example, the network zone controller can decompose the path specification to generate programming for the individual devices of the network zone. In particular, routing tables of the respective devices can be programmed to forward network traffic in accordance with the path specification. As a specific example, an ECMP group can be defined for a specific tunnel corresponding to a source, destination pair. An ECMP table can be programmed for the ECMP group, and the ECMP table can include entries that provide a list of next-hop entries for a destination route. Each next-hop corresponding to an entry of the ECMP table can be selected with equal weight. WCMP can be implemented using the ECMP table by providing more entries for higher weighted next-hops than for lower weighted next-hops. For example, a weight ratio of 2:1 can be implemented by listing the heavier weighted next-hop twice and the lighter weighted next-hop once within the ECMP table. Thus, the network zone controller can be used to implement the higher-level routing decisions from the TE service onto the individual devices of the network zone.

At 1260, the respective devices of the network zone can be configured based on the collected network state. For example, the network zone controller can monitor the state of the network devices and can adjust the forwarding of packets within the network zone without interaction from the TE service. As a specific example, the network zone controller can detect a full or partial reduction in capacity associated with a column of the network zone. The reduction may occur when a link connecting a leaf device to a device of the spine goes down, for example. When the reduction is detected, the network zone controller can take the column of the network zone out of service based on the reduction in capacity. This may be desirable when packets are forwarded across the columns using ECMP routing, and one column has lower capacity than the other columns. By taking the lower capacity column out of service (such as by removing or invalidating the corresponding entries in the ECMP table), the minimum column bandwidth can be increased and the inter-leaf capacity across the spine may be increased.

FIG. 13 depicts a generalized example of a suitable computing environment 1300 in which the described innovations may be implemented. The computing environment 1300 is not intended to suggest any limitation as to scope of use or functionality, as the innovations may be implemented in diverse general-purpose or special-purpose computing systems. For example, the computing environment 1300 can be any of a variety of computing devices (e.g., desktop computer, laptop computer, server computer, tablet computer, etc.).

With reference to FIG. 13, the computing environment 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s).

A computing system may have additional features. For example, the computing environment 1300 includes storage 1340, one or more input devices 1350, one or more output devices 1360, and one or more communication connections 1370. An interconnection mechanism (not shown) such as a bus, controller, or network interconnects the components of the computing environment 1300. Typically, operating system software (not shown) provides an operating environment for other software executing in the computing environment 1300, and coordinates activities of the components of the computing environment 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing environment 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing environment 1300. The output device(s) 1360 may be a display, printer, speaker, CD-writer, or another device that provides output from the computing environment 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests may be generally described herein as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of managing a network zone comprising a plurality of network devices arranged in a leaf and spine architecture, the method comprising:
   collecting operational network state from respective devices of the network zone, the operational network state comprising connectivity, link state, and capacity of the respective devices;
   based on the collected operational network state, using a network zone controller to compile an aggregated topology including a link state section comprising a port group associated with a given leaf of the network zone, the port group having an effective capacity and a plurality of logical ports, wherein:
   a respective logical port of the plurality of logical ports is associated with a client connected to the given leaf of the network zone and having a usable capacity, wherein the given leaf comprises a plurality of interconnected network devices, and
   the effective capacity of the port group represents an internal capacity of the port group and the effective capacity of the port group is not greater than a number of in-service columns multiplied by a minimum capacity of the in-service columns, a respective in-service column being an active connection from the leaf to the spine;
   providing the compiled aggregated topology to a traffic engineering service, the traffic engineering service being different than the network zone controller;
   receiving, from the traffic engineering service, a tunnel specification based on the aggregated topology; and
   configuring the respective devices of the network zone based on the received tunnel specification.

2. The method of claim 1, wherein the usable capacity of the respective logical port is based on a number of network links connecting the client and the given leaf.

3. The method of claim 1, wherein configuring the respective devices of the network zone comprises programming one or more equal cost multi-path tables based on weights of the received tunnel specification.

4. The method of claim 1, further comprising:
   detecting a partial reduction in capacity associated with a column of the network zone; and
   taking the column of the network zone out of service based on the partial reduction in capacity.

5. A computer-readable storage medium including instructions that upon execution cause a computer system to:
   collect network state from respective devices of a network zone, the network zone comprising a plurality of leaves, a respective leaf of the plurality of leaves comprising a plurality of interconnected network devices from the respective devices of the network zone, the respective leaf being connected to one or more clients, and the network state comprising operational link state of the respective devices of the network zone;
   use a network zone controller and the collected network state to build an aggregated topology descriptor of the network zone, the aggregated topology descriptor comprising:
   an inter-network-zone effective capacity for each leaf of the plurality of leaves, wherein the inter-network-zone effective capacity for each leaf represents an internal capacity of the leaf and wherein the inter-network-zone effective capacity for each leaf is less than or equal to a number of in-service columns associated with the leaf multiplied by a minimum column bandwidth of the in-service columns;
   an edge corresponding to each client connected to a respective leaf; and
   an effective capacity corresponding to each edge; and
   transmit the aggregated topology descriptor of the network zone to a traffic engineering service, the traffic engineering service being different than the network zone controller.

6. The computer-readable storage medium of claim 5, wherein the effective capacity corresponding to the edge for each leaf is based on a number of network link connections between the leaf and the client.

7. The computer-readable storage medium of claim 5, wherein the instructions, upon execution, further cause the computer system to:
   receive a path specification based on the transmitted aggregated topology; and
   configure the respective devices of the network zone based on the received path specification.

8. The computer-readable storage medium of claim 5, wherein
   configuring the respective devices of the network zone comprises programming one or more equal cost multi-path tables based on weights of the received path specification.

9. The computer-readable storage medium of claim 5, wherein the instructions, upon execution, further cause the computer system to:
   detect a reduction in capacity associated with a column of the network zone; and
   take the column of the network zone out of service based on the reduction in capacity.

10. The computer-readable storage medium of claim 5, wherein the client of the respective leaf is a service associated with the network zone.

11. The computer-readable storage medium of claim 5, wherein the client of the respective leaf is a different network zone.

12. A system comprising: a traffic engineering service executing on a first group of one or more server computers within a particular network zone, the traffic engineering service for allocating bandwidth of a network; a network zone comprising a plurality of network devices for forwarding network traffic, the network devices arranged as a plurality of leaves connected by a plurality of columns, a respective leaf comprising a plurality of interconnected network devices from the plurality of network devices of the network zone, and the respective leaf being connected to one or more clients; and a network zone controller executing on a second group of one or more server computers, the second group of one or more server computers being different than the first group of one or more server computers, the network zone controller adapted to: generate an aggregated topology descriptor for the network zone based on collected network state of the respective devices of the network zone, the collected network state comprising operational link state of the respective devices of the network zone, the aggregated topology descriptor comprising: an inter-network-zone effective capacity for each leaf of the plurality of leaves, wherein the inter-network-zone effective capacity for each leaf is proportional to a number of in-service columns associated with the leaf multiplied by a minimum column bandwidth of the in-service columns and the inter-network-zone effective capacity is representative of an internal capacity for each leaf; an edge corresponding to each client connected to a respective leaf; and an effective capacity corresponding to each edge; and provide the aggregated topology descriptor for the network zone to the traffic engineering service.

13. The system of claim 12, wherein the effective capacity corresponding to the edge for each leaf is based on a number of active network link connections between the leaf and the client.

14. The system of claim 12, wherein each leaf of the network zone comprises a multi-tiered Clos-based network.

15. The system of claim 12, wherein the network zone controller is further adapted to:
   configure the respective devices of the network zone to forward the network traffic across the columns using equal cost multi-path routing.

16. The system of claim 12, wherein the network zone controller is further adapted to:
   configure the respective devices of the network zone to forward the network traffic between the one or more clients and the respective leaves using weighted cost multi-path routing.

17. The system of claim 12, wherein the network zone controller is further adapted to:
   detect a partial reduction in capacity associated with a given column of the plurality of columns of the network zone; and
   take the given column of the network zone out of service based on the partial reduction in capacity.

\* \* \* \* \*